July 19, 1960   R. J. LIPINSKI   2,945,779
TREATMENT OF TITANIUM AND PRODUCT, AND
COMPOSITION THEREFOR
Filed March 7, 1957

INVENTOR:
RICHARD J. LIPINSKI
BY Howson & Howson
ATTYS.

United States Patent Office

2,945,779
Patented July 19, 1960

2,945,779

TREATMENT OF TITANIUM AND PRODUCT, AND COMPOSITION THEREFOR

Richard J. Lipinski, Erie, Pa., assignor to Lord Manufacturing Company, Erie, Pa., a corporation of Pennsylvania Filed Mar. 7, 1957, Ser. No. 644,490

9 Claims. (Cl. 148—6.24)

The present invention relates to a novel method of improving the bondability of titanium surfaces toward organic polymeric materials and to the resulting treated product; and, more particularly, the invention relates to a novel method whereby the adhesion of polymeric organic materials to titanium is enhanced through chemical treatment of the metal surface, and to the improved bonded assembly. The invention also relates to novel compositions for treating titanium surfaces for improving the bondability thereof toward organic polymeric materials, and to novel products comprising the treated metals. The present application is a continuation-in-part of application Serial No. 563,901, filed February 7, 1956.

The problem of bonding organic polymeric materials to surfaces of titanium is becoming of increasing importance. The problem is presently most prevalent in two main fields: (1) the coating of such metal surfaces with organic polymeric compositions, such as paints and other films, for protective and/or decorative purposes; and (2) the application of an organic polymeric adhesive composition to such metal surfaces in a bonding operation whereby another material, which may be organic or inorganic, is bonded to the titanium surface through the agency of the stated adhesive.

It is generally known that the bonds obtained between organic polymeric materials and surfaces of titanium are not as great as is desired in most instances. Although the actual magnitude of bond strength depends upon the particular metal surface and upon the particular material bonded thereto, with any combination means have been sought by which the adhesion may be increased. It is to the marked increase of adhesion between organic polymeric materials generally to titanium surfaces generally by an entirely new and novel principle that the present invention is directed.

It is the principal object of the present invention to provide a method of increasing the bondability of titanium surfaces toward organic polymeric materials.

It is another object of the present invention to provide a method of bonding organic polymeric materials to titanium surfaces by which improved adhesion between the two stated components is obtained.

It is another object of the present invention to provide a relatively simple and economic method of treating titanium surfaces to markedly enhance the bondability of the treated surface to applied organic polymeric materials.

A further object of the invention is to provide novel assemblies comprising titanium surfaces bonded to organic polymeric materials in which the adhesion between the stated metal surface and the organic polymeric material is greater than in prior assemblies.

Other objects, including the provision of a novel treated titanium surface to which organic polymeric materials can be bonded with increased adhesion, and the provision of novel compositions for treating such metal surfaces, will become apparent from the following specification and the claims.

It has been found that the treatment of a titanium surface with a solution, having a pH below 4, of a nitrosulfonic acid and fluoride ions, in an amount more fully discussed hereinafter, said solution being substantially free of strong acid other than said nitrosulfonic acid, nitric acid and hydrofluoric acid, alters the metal surface involving etching and activation of the surface by formation of a film thereon in such a way that organic polymeric materials applied to the altered surface adhere thereto with a tenacity substantially greater than is the case with similar but untreated titanium surfaces.

The method of the present invention, therefore, comprises wetting the titanium surface with the stated solution until the titanium surface is visibly altered through formation of a film thereon, and recovering the titanium with said film on the surface thereof. The resulting product comprises the titanium surface having thereon a film constituting a reaction product between the titanium and the nitrosulfonic acid. There may then be applied to the treated metal surface the desired organic polymeric material. The resulting product comprises the titanium surface and the organic polymeric material bonded to each other through the agency of a film formed on the metal and constituting a reaction product between the titanium metal of the titanium surface and the nitrosulfonic acid.

The present invention will be more readily understood from a consideration of the drawings in which.

Figure 1:
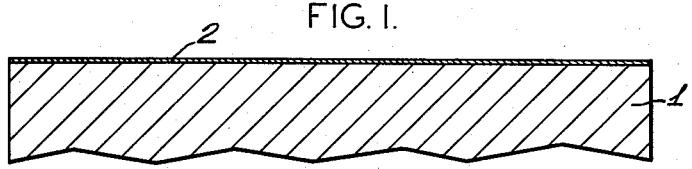
Figure 1 is a side view in section showing a piece of titanium having the film thereon.

The treatment of the present invention has been found to result in vastly improved bonds between titanium surfaces and organic polymeric materials applied thereto. This means that protective and decorative coatings comprising organic polymeric materials which are applied to such treated metal surfaces adhere thereto more tenaciously than the same coatings applied to similar but untreated metal surfaces. Likewise, adhesives comprising polymeric organic material applied to the treated titanium surfaces bond more tenaciously to the treated metal surface so that other structural elements bonded to the metal surface through the agency of the applied adhesive are more tenaciously bonded thereto than is the case with similar assemblies produced, however, without the treatment of the invention.

The reason for the increased adhesion obtained by the present invention is not presently fully understood. It is known, however, that the acid nitrosulfonic acid-fluoride solution initially removes oxide on the metal surface and etches slightly into the surface. More important, however, is the formation of a film which can be visually observed. This film is believed to result from some retention, on the metal surface, of the product of the reaction between the nitrosulfonic acid and the titanium, the metal replacing the hydrogen ion of the nitrosulfonic acid and the residue of the nitrosulfonic acid bonding chemically to the titanium of the metal surface. The titanium atom to which the residue of the nitrosulfonic acid is chemically bonded is itself part of the main mass of metal and is bonded thereto by means of the forces governing its initial incorporation in the surface lattice. The film is thus firmly attached chemically to the titanium surface. The film also appears to be more readily wetted by organic materials applied thereto than is the untreated titanium surface. At any rate, organic materials applied to the film adhere thereto, and hence to the metal body, with much greater tenacity than to the same metal untreated.

The treatment is applicable to titanium, either in pure or commercially pure form or in the form of alloys in which titanium is the major constituent. Examples of titanium alloys which may be treated are: 7–8% manganese, balance titanium; 3–4% manganese and 1–4% aluminum, balance titanium; 1.5–2.5% iron, 1.5–2.5% chromium and 1.5–2.5% molbdenum, balance titanium; 1.25% iron, 5% aluminum and 2.75% chromium, balance titanium; and the like.

As far as the nitrosulfonic acid is concerned it has been found that any sulfonic acid containing one or more nitro ($-NO_2$) groups will provide the improved results. Nitrosulfonic acids, as this term is used herein, include any acid having the general formula $R(SO_3H)_n(NO_2)_m$ where R is any organic radical, preferably an aromatic radical like benzene or naphthalene (including substituted derivatives thereof), and $n$ and $m$ are one or more.

Examples of nitrosulfonic acids which may be employed in accordance with the present invention are:

p-Nitrobenzene sulfonic acid
m-Nitrobenzene sulfonic acid
2-chloro-5-nitrobenzene sulfonic acid
2,4-dinitrobenzene sulfonic acid
o-Nitroanilino-p-sulfonic acid
2-nitrotoluene-4-sulfonic acid
5-nitrotoluene-2-sulfonic acid
2-nitro-bromobenzene-4-sulfonic acid
2,4-dinitronaphthyl-7-sulfonic acid
6-amino-4-nitro-1-phenol-2-sulfonic acid
5-amino-4-nitro-1-phenol-2-sulfonic acid
3,5-dinitro-p-toluene sulfonic acid
4,4'-dinitro-2,2'-stilbene disulfonic acid
1-nitroanthraquinone-5-sulfonic acid In treating the titanium surface with the nitrosulfonic acid-fluoride solution in accordance with the present invention, a solution may be applied to the metal surface as by brushing, spraying, dipping, or the like. The nitrosulfonic acids are soluble in water, at least to the extent required for the present invention, and, hence, water represents the preferred solvent medium for use in treating the metal surfaces. However, other liquids may be used in place of or in conjunction with water, such as alcohols, like methanol and ethanol; glycols; glycerol; glycol ethers; and the like.

The concentration of the nitrosulfonic acid in the treating solution has been found to be relatively immaterial. In this connection, it has been found that the nitrosulfonic acid, even at very low concentrations, selectively reacts with the titanium surface. Thus, concentrations of nitrosulfonic acid in the treating solution as low as about 1%, by weight, are satisfactory. The maximum concentration of the nitrosulfonic acid in the treating medium is limited only by the solubility of the particular nitrosulfonic acid in the particular solvent medium selected. In many cases, the concentration of nitrosulfonic acid may go up to as high as 30–40%, by weight, although no advantage is to be gained by employing concentrations substantially in excess of about 20%, by weight As stated, the pH of the treating medium will be below about 4. In this connection, for general purposes, the lower the pH, that is to say the higher the acidity, the more rapid is the action of the bath on the metal. In some cases the pH may go as low as about .5. The preferred pH range is between about 1 and about 3.

Generally the nitrosulfonic acid, if used as such, will provide the desired pH. However, in the event that it does not, and especially where a salt of the nitrosulfonic acid and/or a fluoride salt is used, nitric acid may be added to the bath to provide the desired pH. Nitric acid, unlike other strong acids, is not detrimental to film-formation. Thus, as stated above, the bath will be substantially free of strong acid other than the nitrosulfonic acid, nitric acid and the limited amount of hydrofluoric acid permitted by the present process to provide fluoride ions in the stated amount.

As stated, the treating bath will also contain fluoride ions provided either by adding hydrofluoric acid or by adding a fluoride or acid fluoride, like sodium bifluoride, capable of liberating fluoride ions in acid solution. In this connection, the use of a fluoride salt, for example an alkali metal fluoride or bifluoride, like sodium fluoride or bifluoride and potassium fluoride; ammonium fluoride; an alkaline earth metal fluoride, like calcium fluoride; nickel fluoride; chromium fluoride; and the like, is particularly advantageous. In order to produce the advantageous results obtained by the present process the fluoride ions must be present in an amount of at least 0.1%, by weight, based on the weight of the nitrosulfonic acid. Greater proportions may be employed until amounts above about 10%, on the same basis, interfere with the formation of the desired film. The above range, therefore, represents that in which a beneficial synergistic effect is obtained on titanium with the nitrosulfonic acid-fluoride ion combination. Preferably, the fluoride ions do not exceed about 5%, by weight, based on the weight of the nitrosulfonic acid.

As will be seen from the above, baths prepared for use in accordance with preferred practice of the invention may be: (1) a bath consisting essentially of the nitrosulfonic acid and fluoride ions, and (2) a bath consisting essentially of the nitrosulfonic acid (either added as such or as a salt), fluoride ions and nitric acid. By "consisting essentially" is meant that the bath will not contain material quantities of other materials, such as strong acid other than the nitrosulfonic acid, nitric acid and the limited amount of hydrofluoric acid that may be employed, which deleteriously affects to a significant extent the advantageous properties of the bath for the purposes herein intended. Of course, additives like wetting agents, complexing agents, and the like, may be employed.

As a commercial composition adapted to be diluted with water or other solvent to provide the bath of the present invention there may be prepared a concentrate of the nitrosulfonic acid and fluoride in a solvent. However, because of the corrosive nature of acid fluoride solutions it is not always feasible to transport and to store treating solutions comprising the nitrosulfonic acid and the fluoride ions. In such case it is preferred to prepare a dry mixture of a dry, solid, finely-divided nitrosulfonic acid and a dry, solid finely-divided fluoride in which the proportion of nitrosulfonic acid to fluoride is sufficient to provide, upon dissolution of the mixture, fluoride ions in the stated concentration and at least about 1%, by weight, of the nitrosulfonic acid as such. An example of such a composition is a mixture of dry, solid, finely-divided nitrosulfonic acid, like 2,4-dinitrobenzene sulfonic acid or 5-nitro-o-toluene sulfonic acid, and a dry, solid, finely-divided fluoride, like sodium bifluoride, in a weight ratio between about 4 to 1 and about 100 to 1.

It will be apparent that the nitrosulfonic acid in solution may be provided by dissolving a salt of the nitrosulfonic acid in a solution sufficiently acid through the addition of nitric acid to provide the nitrosulfonic acid and a pH as defined above.

The temperature of the solution during the treatment may vary somewhat, depending upon the other conditions, principally pH, and in general, the higher the temperature the greater the rate of reaction. Thus temperature can be correlated with the other conditions, principally pH of the solution, to provide any desired rate of reaction. Generally it is desirable to employ elevated temperatures that are over 100° F., in order to obtain a satisfactory rate of reaction. Broadly speaking, however, the temperature of the treating solution may range from room temperature up to the boiling point, although in most cases the temperature need not exceed about 185° F.

As stated, treatment of the titanium surface in accordance with the present invention results in etching of the surface and the formation of a film. This film is discernible to the naked eye, although its thickness may be so minute as not to be readily measurable. During treatment of the metal surface a decided change in the appearance thereof takes place, due in large measure to the etching and formation of the film, and at the outset this change is not uniform over the surface. In time the changed appearance does become uniform, and this uniformity of appearance denotes substantial completion of the treatment. Contact of the solution with the titanium surface may continue beyond this point, although no significant advantage is obtained. As the film which forms builds up over the titanium surface it serves as a barrier layer to reduce etching to a minimum so that the metal can be left in contact with the solution beyond the stated point. The exact time required to complete the treatment depends, as will be apparent from the foregoing, upon the acidity of the treating solution, upon the temperature of treatment, and, to some extent, upon the particular nitrosulfonic acid selected. In view of these variables, it is impossible to set numerical time limits, and, at any rate, one becoming familiar with the process described herein will have no difficulty in determining for any set of conditions a suitable length of treating time. By suitable adjustment of the conditions the treating time can be as short as a few seconds. In many cases, however, such short treating times are not necessary or even desirable so that the conditions can be adjusted to operate in a matter of minutes. Preferably conditions are selected to insure completion of the treatment in less than about 20 minutes.

After treating the titanium surface with the stated solution, the surface is dried, preferably after rinsing with water. The polymeric organic material may then be applied by any conventional means depending upon the exact nature of the polymeric organic material used. The polymeric organic material will generally be of the type that will form a film as is conventional in protective and/or decorative coatings and in adhesives. Such materials include natural and synthetic resins and rubbers, such as phenol-aldehyde resins; urea-aldehyde resins; furfural resins; epoxy resins; polyester resins; silicone resins; polyvinyl resins; polyurethane resins and rubbers; polyamide resins; isocyanate polymers and copolymers; like polyvinyl chloride, polyvinyl acetate, copolymers of vinyl chloride and vinyl acetate, polyvinylidene, and polyvinyl butyral; acrylic resins; polychloroprene; polybutadiene; neoprene; Buna-S; butyl rubber; and the like. The treatment of the present invention produces the most marked results with compositions comprising natural or synthetic resins, and such materials constitute the preferred organic polymeric materials employed herein. The organic material may be applied as a solution or dispersion in a suitable liquid solvent or diluent, or as a pre-formed film.

Figure 2:
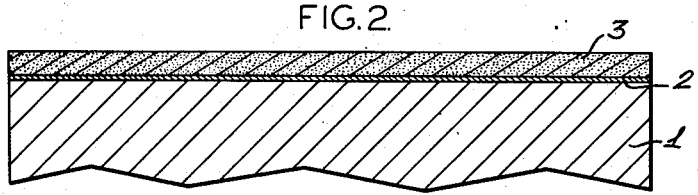
Figure 2 is a side view in section showing a coating adhered to the titanium by virtue of the film on the metal surface.
Figure 3:
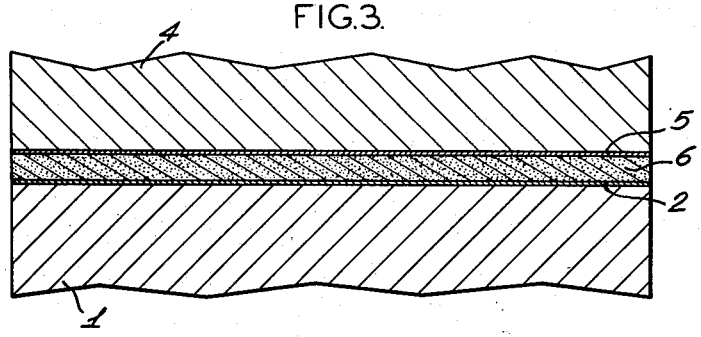
Figure 3 is a side view in section showing two treated pieces of titanium bonded to each other by means of an adhesive.

Referring to the drawings, Figure 1 illustrates a magnified cross-section of a body of titanium 1 the surface of which has been treated in accordance with the present invention to provide film 2 constituting a reaction product between the titanium of the titanium surface and a nitrosulfonic acid. Figure 2 illustrates the product of Figure 1 having thereon a layer 3, of organic polymeric material. Figure 3 illustrates the bonding of the assembly of Figure 1 to another solid body, in this illustration an assembly similar to that of Figure 1 and consisting of titanium body 4 having thereon film 5. Treated titanium bodies 1 and 4 are bonded together by means of organic polymeric adhesive 6. Solid bodies which may be adhesively bonded to titanium as illustrated in Figure 3 may be any solid structural load-carrying material like metals, resins, rubbers, fabrics, wood, leather, glass, ceramics, and the like.

The present invention will be more readily understood from a consideration of the following examples which are given for the purpose of illustration only and are not intended to limit the scope of the invention in any way:

*Examples I–IV*

In these examples two baths are prepared as follows: (A) 30 grams of 2,4-dinitrobenzene sulfonic acid and 0.5 gram of sodium bifluoride in a liter of water; and (B) 30 grams of 2,4-dinitrobenzene sulfonic acid and 1 gram of sodium bifluoride in a liter of water. The baths have a pH of about 1.3.

With the baths at 180° F. sets of two strips each of titanium (hot rolled, annealed) having dimensions of 1" x 4" x .063", are immersed in the baths for periods of 10 and 20 minutes, respectively. The strips are removed, rinsed in water and dried.

To one broad face of each of the strips (for a length of about ¾" from one end) is applied a curing catalyst-containing epoxy resin prepared by mixing 12 parts of diethylene-triamine with 100 parts of epoxy resin. The coated strips are allowed to stand open for 90 minutes at room temperature. Each set of strips is then brought together with the adhesive therebetween to provide a ½" lap joint. About 30 p.s.i. pressure is applied and the assemblies are held for about three hours at 375° F. The assemblies are then removed from the oven and press and allowed to cool to room temperature.

The assemblies are then tested for shear strength on a Baldwin tensile tester. The results are as follows:

| Ex. | Bath | Immersion Time, minutes | Bond Strength, p.s.i. |
|---|---|---|---|
| I | A | 10 | 4,436 |
| II | A | 20 | 4,481 |
| III | B | 10 | 3,456 |
| IV | B | 20 | 3,596 |

Similar but untreated titanium strips bonded in the same manner with the same adhesive exhibit a bond strength of 2122 p.s.i.

*Examples V–VIII*

In these examples two baths are prepared as follows: (A) 30 grams of m-nitrobenzene sulfonic acid and 0.5 gram of sodium bifluoride in one liter of water; and (B) 30 grams of m-nitrobenzene sulfonic acid and 1 gram of sodium bifluoride in one liter of water. The pH of the baths is about 3.6.

Following the procedure of Examples I–IV, the results are as follows:

| Ex. | Bath | Immersion Time, minutes | Bond Strength, p.s.i. |
|---|---|---|---|
| V | A | 10 | 3,000 |
| VI | A | 20 | 3,066 |
| VII | B | 10 | 3,820 |
| VIII | B | 20 | 4,400 |

*Example IX*

In this example a bath is prepared by dissolving 15 grams of the sodium salt of 2,4-dinitrobenzene, 15 ml. of concentrated nitric acid and 0.5 gram of sodium bifluoride in a liter of water. The bath has a pH of about 0.75.

Following the procedure of Examples I–IV, except using an immersion time of 15 minutes, the assembly exhibited a bond strength of 4374 p.s.i.

*Example X*

Substitution of 5-nitro-o-toluene sulfonic acid for the 2,4-dinitrobenzene sulfonic acid in the baths of Examples I-IV, with adjustment of the pH to 1.3 with nitric acid and otherwise following the procedure of Examples I-IV, gives bond strengths of the same order as those obtained in Examples I-IV.

Considerable modification is possible in the selection of the nitrosulfonic acid and fluoride, and auxiliary agents, if any, and in the amount thereof as well as in the particular technique and procedure employed without departing from the scope of the present invention.

I claim:

1. The method of improving the bondability of a titanium surface toward organic polymeric material which comprises contacting said titanium surface with a solution, at a pH below 4, of a nitrosulfonic acid and fluoride ions in an amount between about 0.1% and about 10%, by weight, based on the weight of said nitrosulfonic acid, said solution being substantially free of strong acid other than said nitrosulfonic acid, nitric acid and hydrofluoric acid in an amount to provide said fluoride ions, until said titanium surface is visibly altered through formation of a film thereon and recovering the titanium with said film on the surface thereof.

2. The method of claim 1 wherein the solution has a pH between about 0.5 and about 3.

3. The method of improving the bondability of a titanium surface toward organic polymeric material which comprises contacting said titanium surface with a solution, at a pH below 4, consisting essentially of nitrosulfonic acid and fluoride ions in an amount between about 0.1% and about 10%, by weight, based on the weight of said nitrosulfonic acid, until said titanium surface is visibly altered through formation of a film thereon and recovering the titanium with said film on the surface thereof.

4. The method of improving the bondability of a titanium surface toward organic polymeric material which comprises contacting said titanium surface with a solution, at a pH below 4, of a nitrosulfonic acid, fluoride ions in an amount between about 0.1% and about 10%, by weight, based on the weight of said nitrosulfonic acid, and nitric acid, said solution being substantially free of strong acid other than said nitrosulfonic acid, nitric acid and hydrofluoric acid in an amount to provide said fluoride ions, until said titanium surface is visibly altered through formation of a film thereon and recovering the titanium with said film on the surface thereof.

5. The method of claim 4 wherein said solution consists essentially of said nitrosulfonic acid, fluoride ions and nitric acid.

6. A stable composition of matter in solid, finely-divided form, adapted for dissolution in a solvent to provide a bath for treating titanium surfaces to improve their bondability to organic polymeric material, which comprises a mixture of dry, solid, finely-divided nitrosulfonic acid and a dry, solid, finely-divided fluoride in a weight ratio between about 4 to 1 and about 100 to 1.

7. The product of claim 6 wherein said fluoride is sodium bifluoride.

8. The product of claim 7 wherein said nitrosulfonic acid is 2,4-dinitrobenzene sulfonic acid.

9. The product of claim 7 wherein said nitrosulfonic acid is 5-nitro-o-toluene sulfonic acid.

References Cited in the file of this patent

UNITED STATES PATENTS

| | | |
|---|---|---|
| 1,888,457 | Gahn | Nov. 22, 1932 |
| 2,172,533 | Freeman | Sept. 12, 1939 |
| 2,637,634 | Howard et al. | May 5, 1953 |
| 2,698,781 | Meyer | Jan. 4, 1955 |
| 2,724,667 | MacPherson | Nov. 22, 1955 |
| 2,804,407 | Wallace | Aug. 27, 1957 |

UNITED STATES PATENT OFFICE

CERTIFICATE OF CORRECTION

Patent No. 2,945,779                                July 19, 1960

Richard J. Lipinski

It is hereby certified that error appears in the printed specification of the above numbered patent requiring correction and that the said Letters Patent should read as corrected below.

Column 6, line 65, after "2,4-dinitrobenzene" insert -- sulfonic acid --.

Signed and sealed this 4th day of April 1961.

(SEAL)
Attest: ERNEST W. SWIDER

XMAXLXFXXMLXM
Attesting Officer

ARTHUR W. CROCKER
Acting Commissioner of Patents